United States Patent Office.

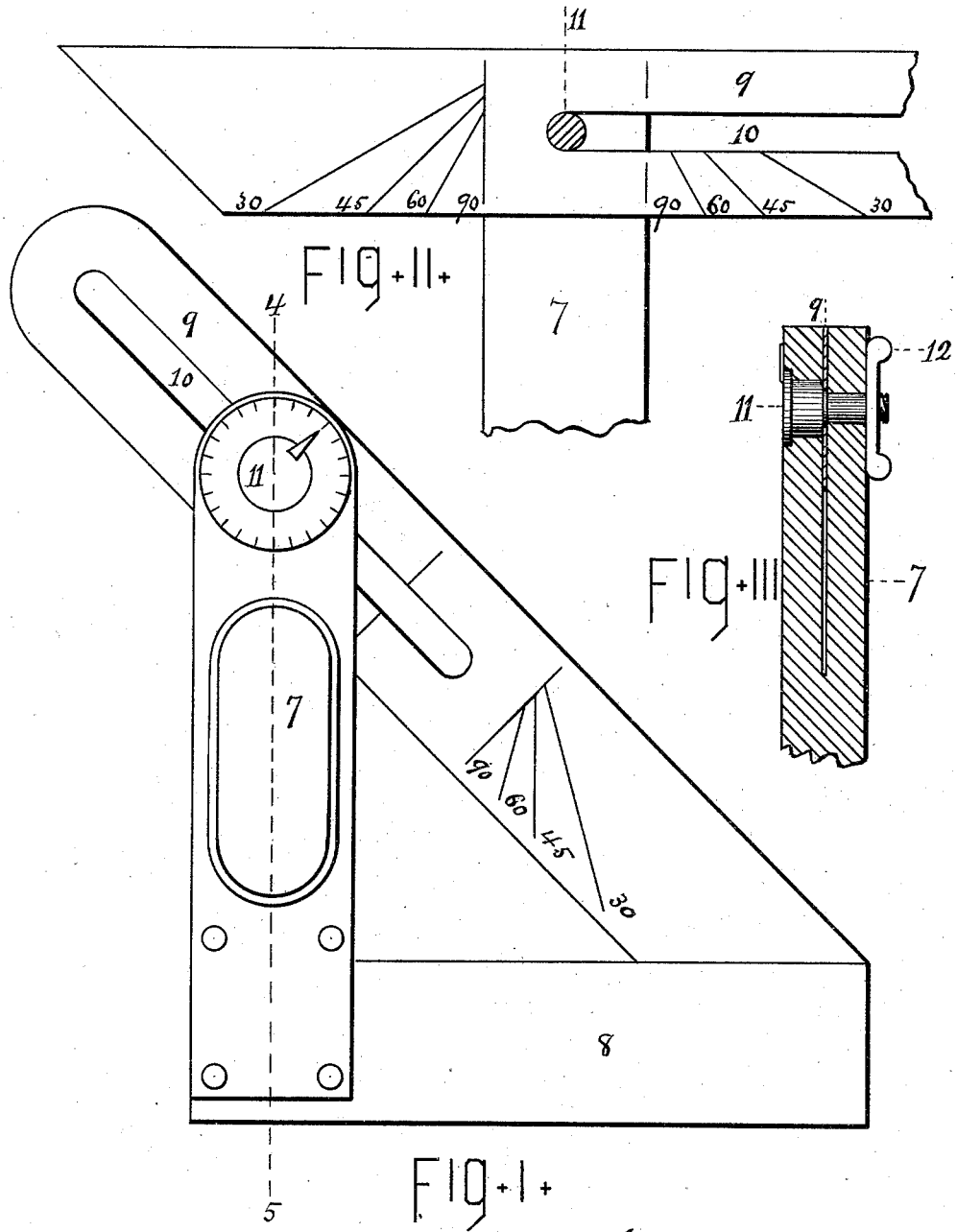

FRANK SEYMOUR TALMADGE, OF PALMER, MASSACHUSETTS.

TRY-SQUARE, BEVEL, AND PROTRACTOR.

SPECIFICATION forming part of Letters Patent No. 396,781, dated January 29, 1889.

Application filed February 16, 1888. Serial No. 264,302. (No model.)

*To all whom it may concern:*

Be it known that I, FRANK SEYMOUR TALMADGE, a citizen of the United States, residing at Palmer, in the county of Hampden and Commonwealth of Massachusetts, have invented a new and useful Improvement in a Try-Square, Bevel, and Protractor Combined, of which the following is a specification, reference being had to the accompanying draw10 ings, wherein—

Figure 1 is a side elevation of my improved instrument; Fig. 2, a sectional view of a portion of the same, showing the marking and use of the bevel as a protractor; and Fig. 3, an15 other sectional view through line 4 5.

My invention relates to the combination of a try-square, bevel, and protractor in one instrument; and it consists in the construction and arrangement of the several parts, as de20 scribed and claimed below, the object thereof being cheapness and convenience.

The details and operation of my invention are as follows:

In the drawings, the part marked 7 repre25 sents the stock or handle; 8, the fixed or "square" blade; 9, the movable or bevel blade; 10, the slot in blade 9; 11, the shouldered rivet or bolt, and 12 the set-nut.

I make the stock 7 of wood or metal, in the usual form, and provide the same at either end with a slot adapted to receive the blades 8 and 9, respectively. I make the blade 8 a flat straight piece of steel and rivet the same in stock 7 and at right angles thereto, in the usual manner. I make blade 9 of a similar piece of steel cut at an angle of forty-five degrees at one end, and provide the same with the longitudinal slot 10 and with degree-markings, as shown in Figs. 1 and 2. These markings may extend from zero to ninety degrees, though only those more commonly useful are shown in the drawings. I provide the rivet 11 with a countersunk head and with a shoulder near the middle thereof broad enough to catch the blade 9 on opposite sides of slot 10, as shown in Fig. 3, the object of this arrangement being to set and hold the bevel more steadily and firmly at any desired angle by bringing pressure directly on the blade from the shoulder and indirectly from the head through the stock whenever the nut 12 is turned on or tightened. I make the nut 12 in the usual manner. By this construction and arrangement I make the three instruments in one much cheaper than they can be made separately. They occupy less room in the tool-chest. The blade 9, when set in line with stock 7, forms a continuation thereof or longer stock to blade 8, specially useful in marking large stuff, and when arranged as in Fig. 1 blade 9 serves as a support and convenience in keeping the blade 8 flat or level on the stuff marked. I make the several parts of such proportions that when arranged as in Fig. 1 the blade 9 will always give the common miter or angle of forty-five degrees.

To find and lay off other angles, I loosen nut 12, bring blade 9 with reference to rivet 11 to the position shown in Fig. 2, and cause the same to revolve around such rivet till the mark indicating the angle desired impinges on and is parallel to the adjacent side of stock 7, where it is clamped by means of nut 12.

What I claim as my invention is—

The blade 9, cut at one end at an angle of forty-five degrees and provided with slot 10 and degree-markings, in combination with the stock 7 and blade 8, shouldered rivet 11, and nut 12, all constructed, arranged, and operating as specified.

FRANK SEYMOUR TALMADGE.

Witnesses:
SIDNEY SANDERS,
WILLIAM E. DAVIS.